United States Patent [19]

Clarke et al.

[11] Patent Number: 5,009,784

[45] Date of Patent: Apr. 23, 1991

[54] CYCLONE SEPARATOR WITH OPPOSITELY DIRECTED SEPARATING CHAMBERS

[75] Inventors: Neville Clarke, Naree Warren; Reimer Z. Hansen, Mount Eliza, both of Australia

[73] Assignee: Conoco Specialty Products Inc., Houston, Tex.

[21] Appl. No.: 343,178

[22] PCT Filed: Oct. 2, 1987

[86] PCT No.: PCT/AU87/00336

§ 371 Date: Jun. 1, 1989

§ 102(e) Date: Jun. 1, 1989

[87] PCT Pub. No.: WO88/02280

PCT Pub. Date: Apr. 7, 1988

[30] Foreign Application Priority Data

Oct. 3, 1986 [AU] Australia ............................ PH8333

[51] Int. Cl.[5] .............................................. B01D 17/038

[52] U.S. Cl. ................................ 210/512.1; 55/459.1; 209/144; 209/211

[58] Field of Search ............................ 55/459.1–459.5, 55/460; 209/144, 211; 210/85, 512.1, 512.2, 512.3

[56] References Cited

U.S. PATENT DOCUMENTS

| | | | |
|---|---|---|---|
| 1,919,653 | 7/1933 | Hill | 210/85 |
| 2,236,629 | 4/1941 | Parker | 210/512.1 |
| 2,301,371 | 11/1942 | Corwin | 210/512.1 |
| 2,915,369 | 12/1959 | Oaks et al. | 210/512.1 |
| 3,259,246 | 7/1966 | Stavenger | 210/512.1 |
| 4,237,066 | 12/1980 | Colman et al. | 210/512.1 |
| 4,244,708 | 1/1981 | Bielefeldt | 209/144 |
| 4,473,478 | 9/1984 | Chivrall | 210/512.2 |
| 4,657,678 | 4/1987 | Kuhasalo et al. | 209/211 |
| 4,721,565 | 1/1988 | Carroll et al. | 210/512.1 |

FOREIGN PATENT DOCUMENTS

| | | | |
|---|---|---|---|
| 529487 | 5/1954 | Belgium | 55/460 |
| 30153 | 1/1978 | Finland | 209/211 |
| 177361 | 5/1966 | U.S.S.R. | 210/512.2 |
| 453196 | 1/1975 | U.S.S.R. | 209/144 |
| 507363 | 4/1976 | U.S.S.R. | 209/211 |
| 510269 | 6/1976 | U.S.S.R. | 209/211 |
| 548319 | 4/1977 | U.S.S.R. | 210/512.2 |
| 740716 | 6/1980 | U.S.S.R. | 210/512.2 |
| 507763 | 11/1980 | U.S.S.R. | 209/211 |
| 860872 | 9/1981 | U.S.S.R. | 209/211 |
| 886998 | 12/1981 | U.S.S.R. | 209/211 |
| 889049 | 12/1981 | U.S.S.R. | 210/512.1 |
| 915969 | 3/1982 | U.S.S.R. | 209/144 |
| 969326 | 11/1982 | U.S.S.R. | 209/211 |

*Primary Examiner*—Robert A. Dawson
*Assistant Examiner*—Joseph Drodge
*Attorney, Agent, or Firm*—John E. Holder

[57] ABSTRACT

A cyclone separator for separating components of a liquid mixture including oil and water phases has oppositely disposed separating chambers with a common intermediate portion positioned between the separating chambers which provides a common inlet and in one embodiment, a common overflow outlet. The oppositely directed underflow outlets can be curved to meet at a common discharge point.

9 Claims, 3 Drawing Sheets

CYCLONE SEPARATOR WITH OPPOSITELY DIRECTED SEPARATING CHAMBERS

This invention relates generally to cyclone separators for separating multiphase mixtures such as, for example, oil/water mixtures.

Cyclone separators generally comprise an elongated separating chamber having a feed inlet proximate to one end and in most cases an overflow outlet at that end and an underflow outlet at the other end. The overflow outlet is normally adapted for removing the less dense phase and the underflow outlet for removing the more dense phase. One of the problems associated with the efficiency of cyclone separators is the presence of secondary flow due to the end wall at the overflow outlet end which tends to slow down the spin velocity and thus provide areas of low resistance flow from the outer regions of high pressure to the inner regions of low pressure.

It is an object of the present invention to provide an improved cyclone separator which has an improved efficiency.

According to the present invention there is provided a cyclone separator comprising elements designed, sized and arranged for treating a mixture of fluids for separating at least in part a more dense component of a mixture from a less dense component thereof, the cyclone separator being characterized by a separating chamber having a central axis of symmetry between opposite first and second ends, the separating chamber including two parts and an intermediate portion which is intermediate said ends between said parts, the intermediate portion being of greater cross sectional dimension than either of the opposed ends, the separating chamber having first outlet means for discharging one of the separated phases and second outlet means for discharging the other of the separated phases the separator further including feed inlet means proximate to the intermediate portion.

Preferably the intermediate portion is of generally cylindrically form.

Preferably the first outlet means is defined by the free ends of the two parts of the separating chamber.

In one form the second outlet means comprises a pair of collector tubes each being at least partially disposed within a respective part of said separating chamber one end of each tube receiving a separated phase of the mixture and discharging it from the other end. Preferably the tubes are co-axial with the longitudinal axis of the separating chamber.

In another form the second outlet means comprises intake ports opening towards respective parts of the separating chamber and a take-off tube for discharging the separated phase from the chamber. Preferably the second outlet means comprises a collector tube arranged generally parallel to or co-axial with the longitudinal axis of the separating chamber the ports being defined by the opposite ends of the collector tube. The collector tube may be operatively connected to the take-off tube so as to form a generally T-shaped member.

Preferably each part of the separating chamber comprises a primary portion adjacent the intermediate portion; a secondary portion of generally conical shape and a tertiary portion of generally cylindrical shape.

In one form the tertiary portion is curved along the longitudinal axis thereof so that the two ends are joined to a common discharge outlet.

Preferred embodiments of the invention will hereinafter be described with reference to the accompanying drawings in which:

FIG. 1 ia a schematic view of a cyclone separator taken along the axis thereof according to the invention;

Figure 1:
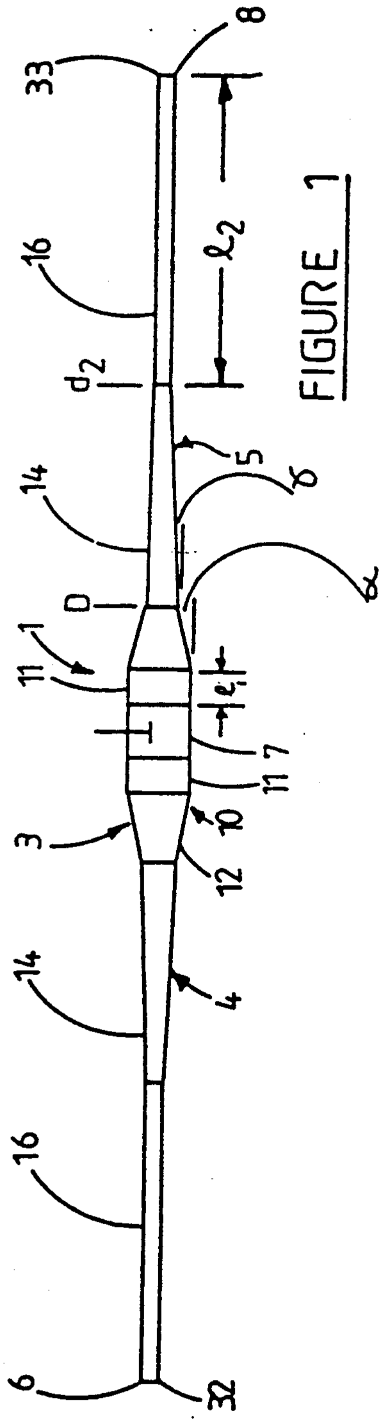
Figure 3:
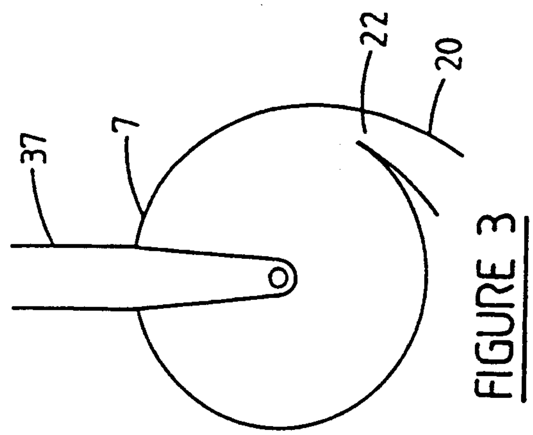
FIG. 3 is a schematic view of the section shown in FIG. 2 viewed in the axial direction.
Figure 2:
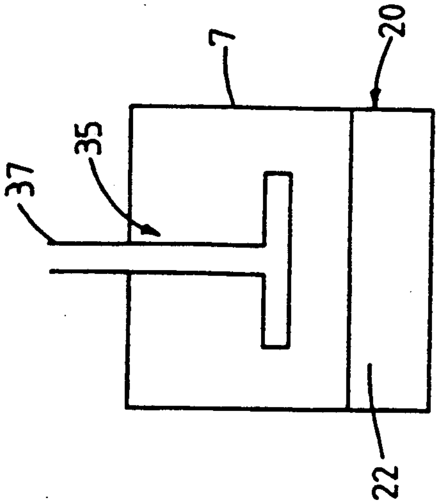
FIG. 2 is a schematic detail of a section of the separator shown in FIG. 1.
Figure 4:
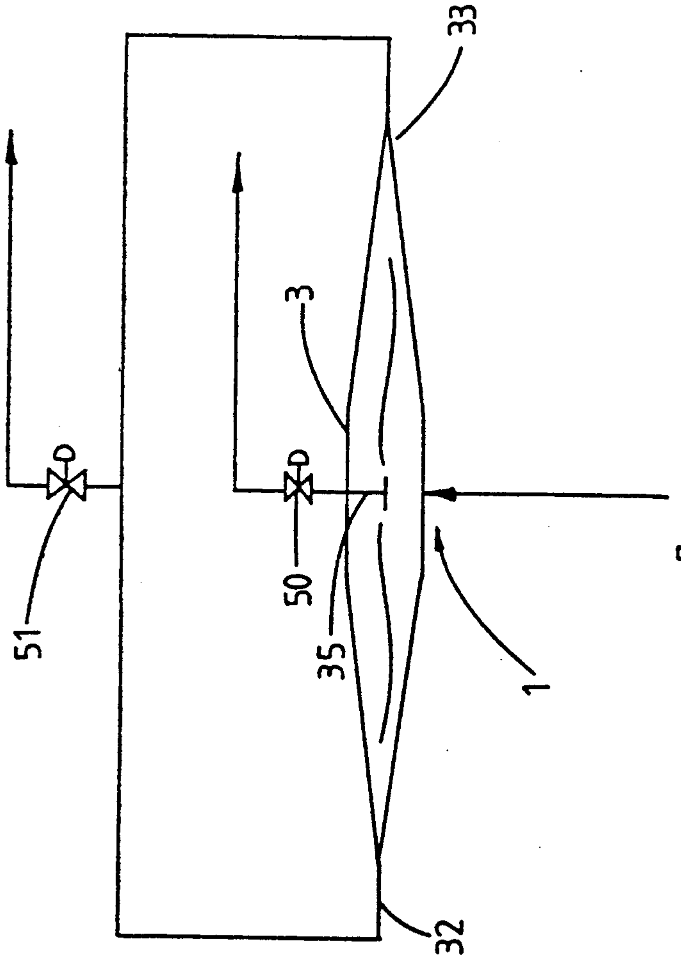
FIG. 4 is a diagrammatic view of the system incorporating a cyclone separator according to the invention.

The cyclone separator generally indicated at 1 comprises a separating chamber 3 comprising two parts 4 and 5 with an intermediate portion 7 between the two parts 4 and 5 having ends 6 and 8. Each part 4 and 5 of the separating chamber maybe constructed in any suitable way. Suitable geometrical arrangements have been will documented and can be formed in any of applicant's co-pending patent applications or granted patents For example reference can be made to U.S. Patent Nos. 4,464,264, 4,544,486, 4,237,006 and 4,764,287 contents of which are to to be considered to be incorporated herein.

As shown in FIG. 1 the separating chamber parts 4 and 5 comprise a primary portion 10 which includes a straight cylindrical section 11 and a conical section 12, a secondary portion 14 which is of a general conical section and a tertiary portion 16 in which is generally cylindrical. In the particular form shown the following relationships apply for a nominal diameter D.

$l_1 = D$ $l_2 = 20\ D$ $\alpha = 10°$ $\gamma = 15.°$ $d_2 = D/2$

Inlet means 20 is provided at the intermediate portion 7 for delivering the mixture to the separating chamber 3. As shown the inlet means 20 comprises a single inlet channel 22 which is preferably involute in form. Whilst a single inlet 22 has been shown it will be appreciated what two or more inlets could be provided. Furthermore, it is not essential that the channel be involute in form and could take other configurations.

The cyclone separator 1 further comprises first outlet means which as shown in FIG. 1 comprises the ends 32 and 33 of the cylindrical tertiary portions 16. These outlets in use collect the heavier component phase of the mixture.

The cyclone separator 1 further includes second outlet means 35 for collecting the lighter component phase of the mixture. In the embodiment shown in FIGS. 1 to 5 the second outlet means comprises a collector tube 36 which is generally co-axial with the longitudinal axis of the intermediate portion of the separator, and a take-off tube 37 which receives and discharges the lighter phase. It is desirable that the take-off tube 37 is streamlined so as to reduce the disturbance of the flow entering via inlet 22. The length of the collector tube 36 can be selected depending upon the operating conditions of the separator.

Figure 6:
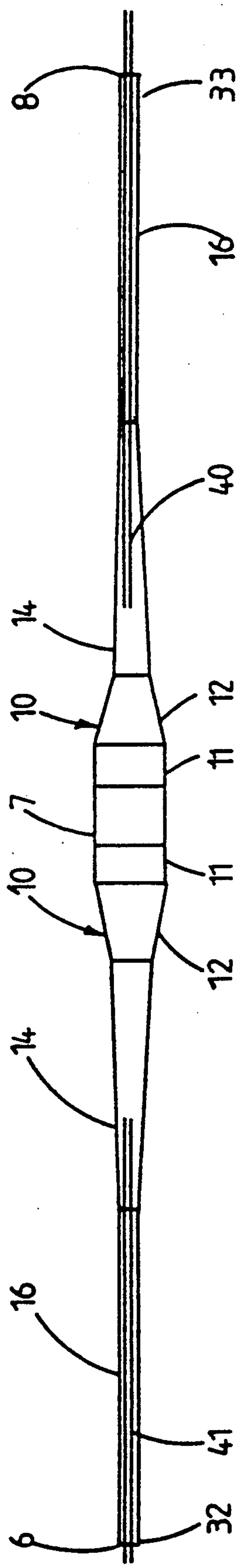
FIG. 6 is a schematic view of yet another form of cyclone separator according to the invention.

In the embodiment shown in FIG. 6 the second outlet means comprises a pair of tubes 40 and 41 extending into respective portions of the separating chamber from the ends 32 and 33 of the tertiary portion 16. The tubes 40 and 41 are positioned so that the core of lighter phase material which is formed when the separator is in operation is passed through the tubes and out of the separator.

Figure 5:
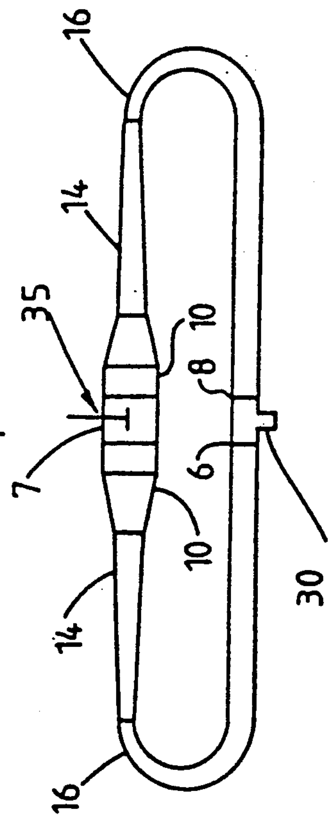
FIG. 5 is a schematic view of another form of cyclone separator according to the invention.

In the embodiment of FIG. 5 the tertiary portions 16 of each chamber are curved so that the fluid dicharged therefrom is fed to a common discharge outlet 30. It has been found that in some cases the tertiary portions of the separating chambers can be curved and this is described in applicants co-pending application PCI-/AU88/00384 entitled "Cyclone Separator with Curved Downstream Section".

Suitable valve means may be provided to control the operation of the cyclone separator. For example, as shown a single valve 50 is provided at the outlet 35 and a single common valve 51 is used for the outlets 32 and 33. It will be appreciated however that individual valves could be provided at all outlets when desired.

Finally, it is to be understood that various alterations, modifications and or additions may be incorporated into the various constructions and arrangements of parts without departing from the spirit and ambit of the invention.

We claim:

1. A cyclone separator comprising elements designed, sized and arranged for treating a mixture of liquids including oil and water phases, for separating at least in part a more dense liquid component of the mixture from a less dense liquid component thereof, the cyclone separator being characterized by a stationary separating chamber having a central axis of symmetry between opposite first and second ends, the separating chamber including two tapered parts and an intermediate portion which is intermediate said ends between said tapered parts, the intermediate portion being of greater cross sectional dimension than either of the opposed ends, each said part comprises a primary portion adjacent said intermediate portion a conical section a secondary portion of generally conical shape and of a smaller angle of conicity than said conical section and a tertiary portion of generally cylindrical shape, the separating chamber having first outlet means for discharging the more dense liquid component of the separated phases and second outlet means for discharging the less dense liquid component of the separated phases, the separator further including feed inlet means proximate to the intermediate portion.

2. A cyclone separator according to claim 1 wherein said intermediate portion is of generally cylindrically form.

3. A cyclone separator according to claim 1 or claim 2 wherein said first outlet means is defined by the opposite first and second ends of the two tapered parts of the separating chamber.

4. A cyclone separator according to claim 1, wherein said second outlet means comprises a pair of collector tubes each being at least partially disposed within a respective part of said separating chamber, one end of each tube receiving a separated phase of the mixture and discharging it from the other end.

5. A cyclone separator according to claim 4 wherein said tubes are co-axial with the longitudinal axis of the separating chamber.

6. A cyclone separator according to claim 1 wherein said second outlet means comprises intake ports opening towards the opposite first and second ends of the separating chamber and a streamlined take-off tube which is arranged to reduce the disturbance to flow entering through the fluid inlet for discharging the separated phase from the chamber.

7. A cyclone separator according to claim 6 wherein said second outlet means comprises a collector tube arranged generally parallel to the longitudinal axis of the separating chamber, said ports being defined by the opposite ends of said collector tube, said collector tue being operatively connected to said take-off tube so as form a generally T-shaped member.

8. A cyclone separator according to claim 1 wherein said tertiary portion is curved with respect to the longitudinal axis of the separation chamber.

9. The apparatus of claim 1 wherein the length of the separating chamber is greater than 20 D where D is the nominal diameter at the end of said tapered part nearest to said intermediate portion.

* * * * *

UNITED STATES PATENT AND TRADEMARK OFFICE

CERTIFICATE OF CORRECTION

PATENT NO. : 5,009,784

DATED : April 23, 1991

INVENTOR(S) : Neville Clarke, et al.

It is certified that error appears in the above-identified patent and that said Letters Patent is hereby corrected as shown below:

Column 2, line 42, "15.° should be --1.5°--.

Column 4, line 34, "tue" should be --tube--.

Signed and Sealed this

Thirteenth Day of October, 1992

*Attest:*

DOUGLAS B. COMER

*Attesting Officer*

*Acting Commissioner of Patents and Trademarks*